(12) United States Patent
Tian

(10) Patent No.: US 10,713,643 B2
(45) Date of Patent: Jul. 14, 2020

(54) SYSTEMS AND METHODS FOR PHYSICAL LOCATION VERIFICATION

(71) Applicant: PAYPAL, INC., San Jose, CA (US)

(72) Inventor: Cheng Tian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 468 days.

(21) Appl. No.: 15/634,130

(22) Filed: Jun. 27, 2017

(65) Prior Publication Data

US 2018/0374075 A1    Dec. 27, 2018

(51) Int. Cl.

| | |
|---|---|
| G06Q 20/32 | (2012.01) |
| H04L 29/06 | (2006.01) |
| G06Q 20/40 | (2012.01) |
| G06K 9/00 | (2006.01) |
| H04W 12/06 | (2009.01) |
| H04W 12/10 | (2009.01) |
| H04W 4/02 | (2018.01) |
| G06K 9/22 | (2006.01) |
| H04W 4/23 | (2018.01) |
| G06Q 50/00 | (2012.01) |
| G06K 9/32 | (2006.01) |

(52) U.S. Cl.
CPC ..... *G06Q 20/3224* (2013.01); *G06K 9/00664* (2013.01); *G06K 9/00892* (2013.01); *G06K 9/22* (2013.01); *G06Q 20/3276* (2013.01); *G06Q 20/4014* (2013.01); *H04L 63/0492* (2013.01); *H04L 63/08* (2013.01); *H04L 63/123* (2013.01); *H04W 4/023* (2013.01); *H04W 4/23* (2018.02); *H04W 12/06* (2013.01); *H04W 12/10* (2013.01); *G06K 2009/3225* (2013.01); *G06Q 50/01* (2013.01)

(58) Field of Classification Search
CPC .......... G06Q 20/3224; G06Q 20/3276; G06Q 20/4014; G06Q 50/01; G06K 2009/3225; G06K 9/00664; G06K 9/00892; G06K 9/22; H04L 63/0492; H04L 63/08; H04L 63/123; H04W 12/06; H04W 12/10; H04W 12/023; H04W 12/23
See application file for complete search history.

(56) References Cited

U.S. PATENT DOCUMENTS

| | | | |
|---|---|---|---|
| 8,326,315 B2 | 12/2012 | Phillips et al. | |
| 8,666,434 B1 * | 3/2014 | Taylor | G01S 19/39 455/404.2 |

(Continued)

*Primary Examiner* — Steven S Kim
(74) *Attorney, Agent, or Firm* — Haynes and Boone, LLP

(57) ABSTRACT

Systems and methods for a physical location verification system include receiving, from a first user device, a first physical location associated with the first user device. A first feature physically located at the first physical location is determined. A first physical location verification request associated with displaying a first reference image including a first marker associated with the first feature on the first user device. Movement data associated with a first movement of the first user device is received from a sensor system of the first user device. First image data captured by a first camera of the first user device during the first movement in response to the physical location verification request is received from the first user device. The first image data and the first movement data are analyzed to verify that the first user device is physically located at the first physical location.

20 Claims, 15 Drawing Sheets

(56) References Cited

U.S. PATENT DOCUMENTS

| | | | |
|---|---|---|---|
| 9,009,764 B2* | 4/2015 | Walker | H04N 21/44204 |
| | | | 725/91 |
| 9,140,555 B1* | 9/2015 | Andersson | H04W 4/38 |
| 9,282,435 B2 | 3/2016 | Ward et al. | |
| 9,294,280 B2* | 3/2016 | Malaney | H04L 9/0852 |
| 9,349,126 B2 | 5/2016 | Doris-Down et al. | |
| 9,571,965 B2 | 2/2017 | Stopel et al. | |
| 10,573,020 B1* | 2/2020 | Sokolov | H04W 4/02 |
| 2013/0095924 A1* | 4/2013 | Geisner | G06F 3/012 |
| | | | 463/32 |
| 2013/0100306 A1* | 4/2013 | Bekiares | H04N 5/23296 |
| | | | 348/211.99 |
| 2013/0104203 A1* | 4/2013 | Davis | H04L 9/3231 |
| | | | 726/5 |
| 2014/0270345 A1* | 9/2014 | Gantman | G01C 21/26 |
| | | | 382/103 |
| 2015/0070352 A1* | 3/2015 | Jones | G06T 7/75 |
| | | | 345/420 |
| 2015/0088703 A1* | 3/2015 | Yan | G06F 3/147 |
| | | | 705/28 |
| 2015/0350160 A1 | 12/2015 | Nathan et al. | |
| 2016/0005211 A1* | 1/2016 | Sarkis | G06T 19/00 |
| | | | 345/419 |
| 2018/0268305 A1* | 9/2018 | Dhondse | G06F 16/219 |
| 2019/0230306 A1* | 7/2019 | Liu | H04N 5/3559 |

\* cited by examiner

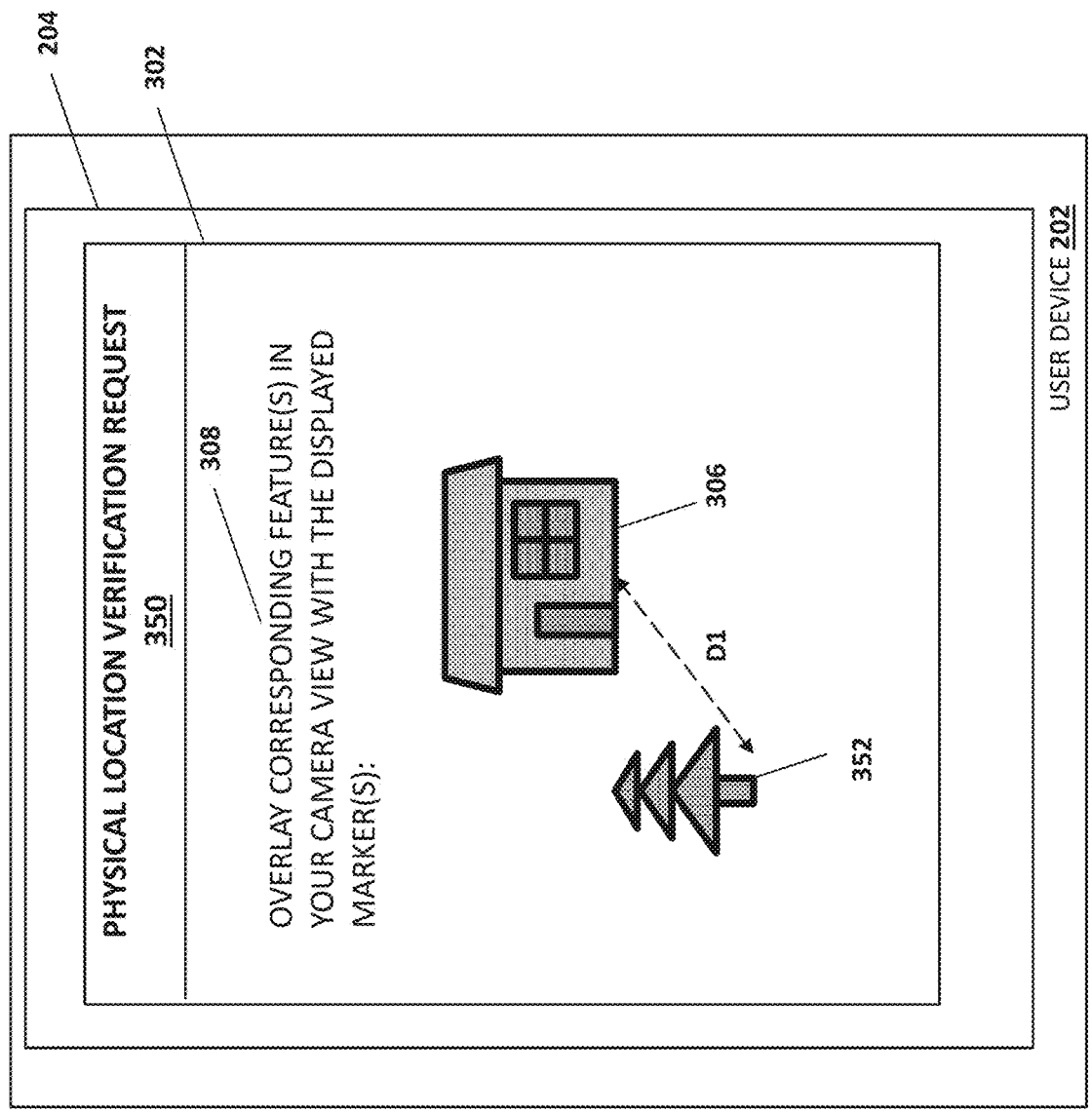

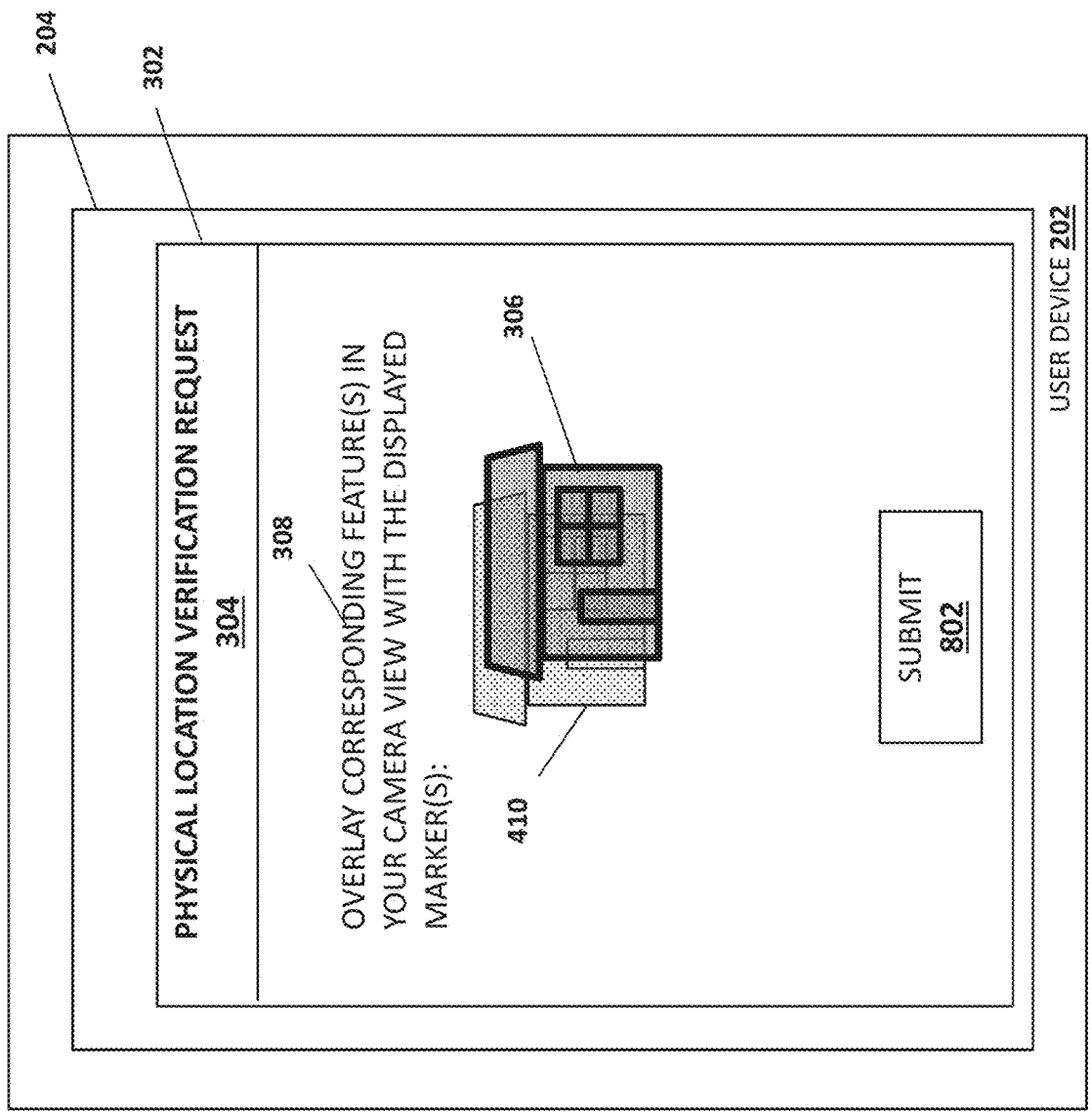

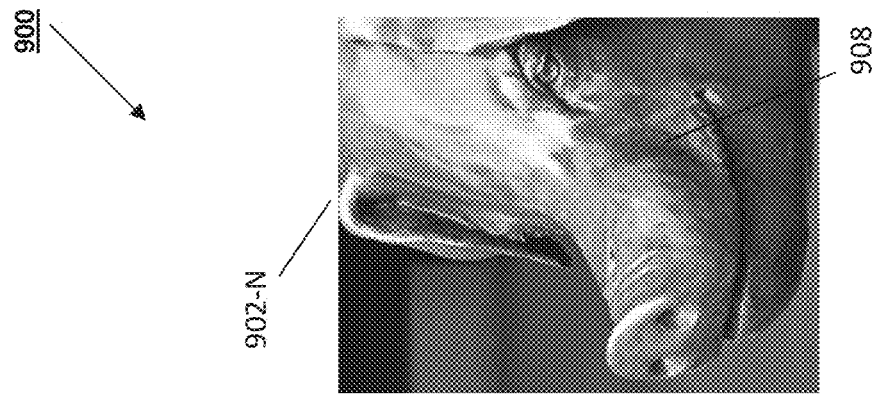
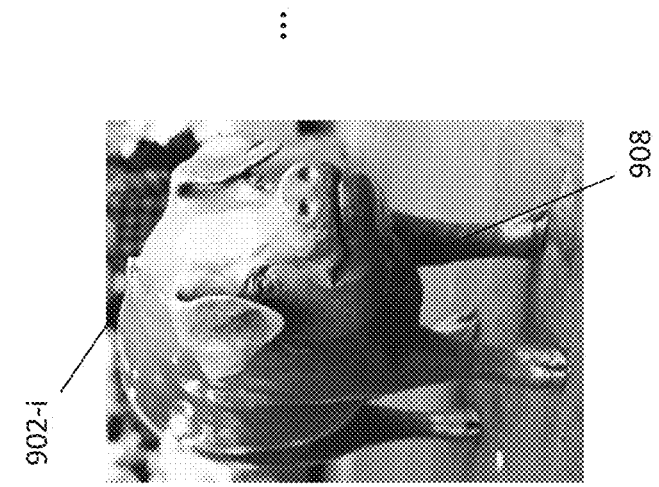
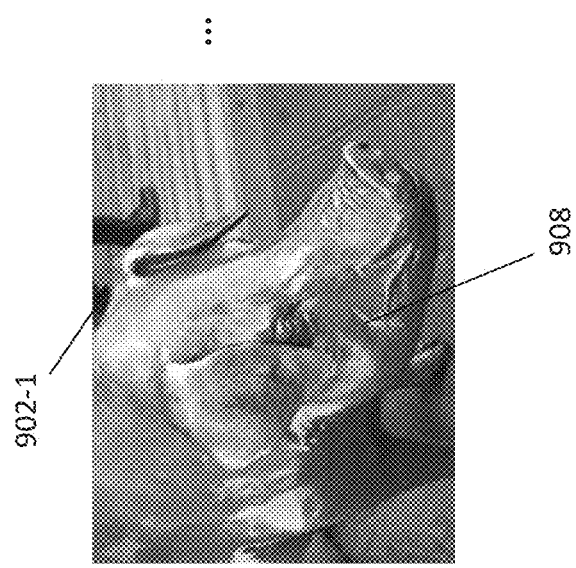
FIGURE 9A

SYSTEMS AND METHODS FOR PHYSICAL LOCATION VERIFICATION

BACKGROUND

The present disclosure generally relates to electronic authentication, and more particularly to physical location verification of users using mobile electronic devices.

BRIEF DESCRIPTION OF THE FIGURES

FIG. 3B is a schematic view illustrating an embodiment of a user device displaying a physical location verification request;

FIG. 8 is a schematic view illustrating an embodiment of a user device displaying a physical location verification request screen;

FIG. 9A is a schematic view illustrating an embodiment of image data captured by a user device in response to a physical location verification request;

Figure 1:
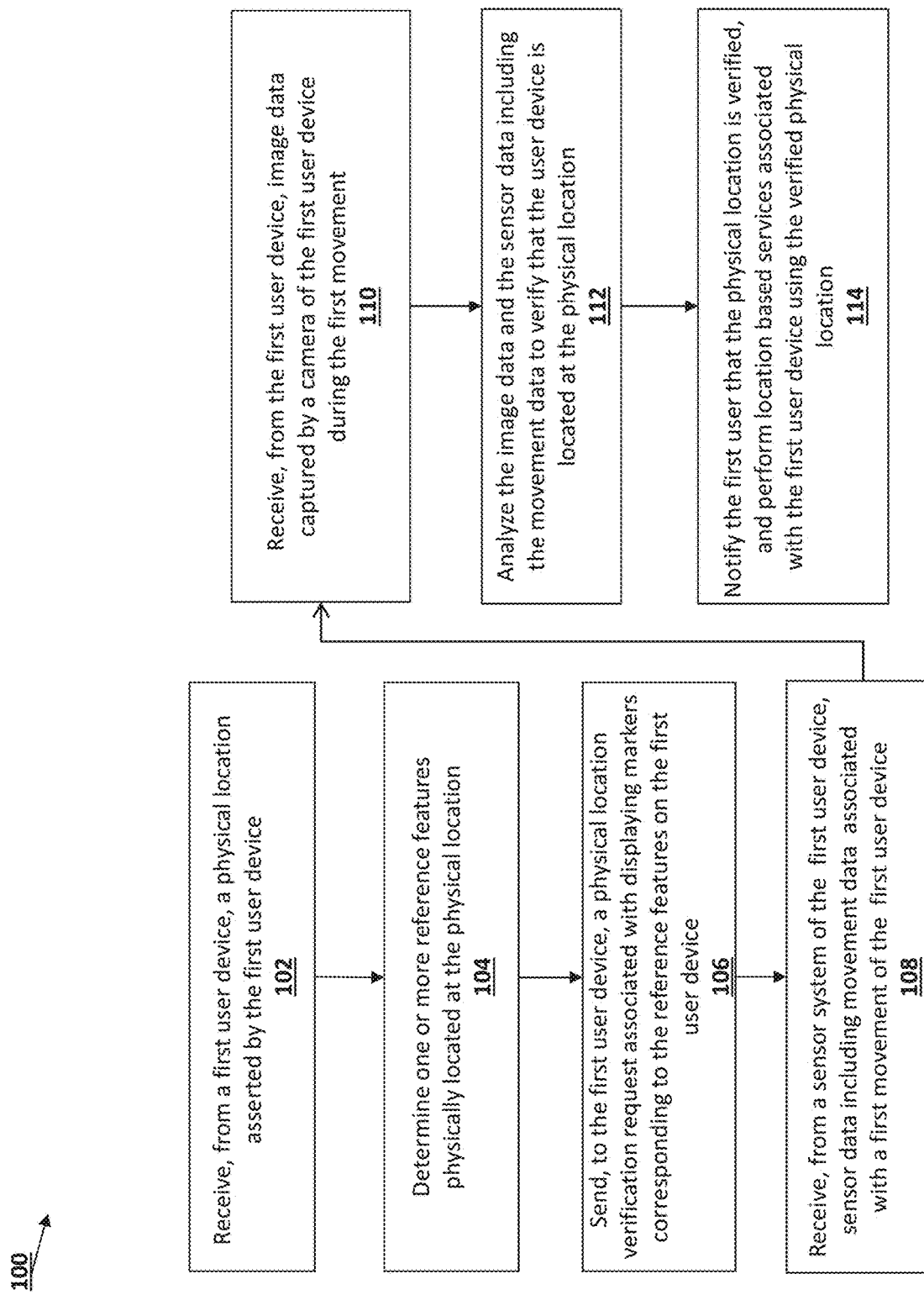
FIG. 1 is a flow chart illustrating an embodiment of a method for electronic location authentication.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Consumers routinely purchase products and services from merchants and individuals alike. The transactions may take place directly between a physical or on-line merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why on-line and mobile purchases are growing very quickly.

Before such transactions occur, however, security measures are generally used so that electronic authorization can be performed to ensure the validity of a transaction and prevent unauthorized access to accounts or credentials. As threats to security continually evolve, new and innovative ways for location systems may be used for determining and tracking the locations of the users of mobile devices such as cellular phones, including global positioning systems (GPS). Furthermore, physical location check-in services have been provided by social network service providers to help connect people in the real world. While the physical location provided by the user device is expected as an actual, real-time location of the user, some users of mobile devices may provide spoofed physical locations to application providers out of security concerns, privacy concerns, or sheer malice.

The present disclosure describes systems and methods for providing a physical location verification system for detecting spoofed physical locations and/or verifying the actual real-time physical location of the user. In embodiments of the systems and methods described herein, a system provider may perform a physical location verification process to verify that a user is actually at the physical location asserted by the user device. For example, the service provider device may determine reference features that are physically located at the asserted physical location, and send to the user device a physical location verification request for displaying a reference image including markers of those reference features on the user device. In response to the physical location verification request, the user may move the user device such that corresponding features in the camera view overlay the markers displayed on the user device. By matching the features in the camera view of the user device with the markers of the reference features, the service provider device verifies that the user is actually at the physical location. To further prevent location spoofing, the service provider device may send movement instructions (e.g., including random user device movements) to the user. By analyzing imaging data captured while the user device is moved according to the movement instructions, the service provider device may detect location spoofing using pre-captured still images or videos. Furthermore, the service provider device may determine the reference features based on latest images of the physical location captured by other users, thereby providing more updated reference features for the physical location verification. Additionally, the service provider device may determine the reference features, the movement instructions, and/or the verification criterion based on the image data and movement data based on a trust level of the user device and/or the user account, thereby achieving a balance of improved security and less interrupted user experience.

Referring to FIG. 1, an embodiment of a method 100 for providing physical location verification is illustrated. The method 100 may begin at block 102 where a system provider device receives, from a user device, a physical location asserted by the user device.

Figure 2:
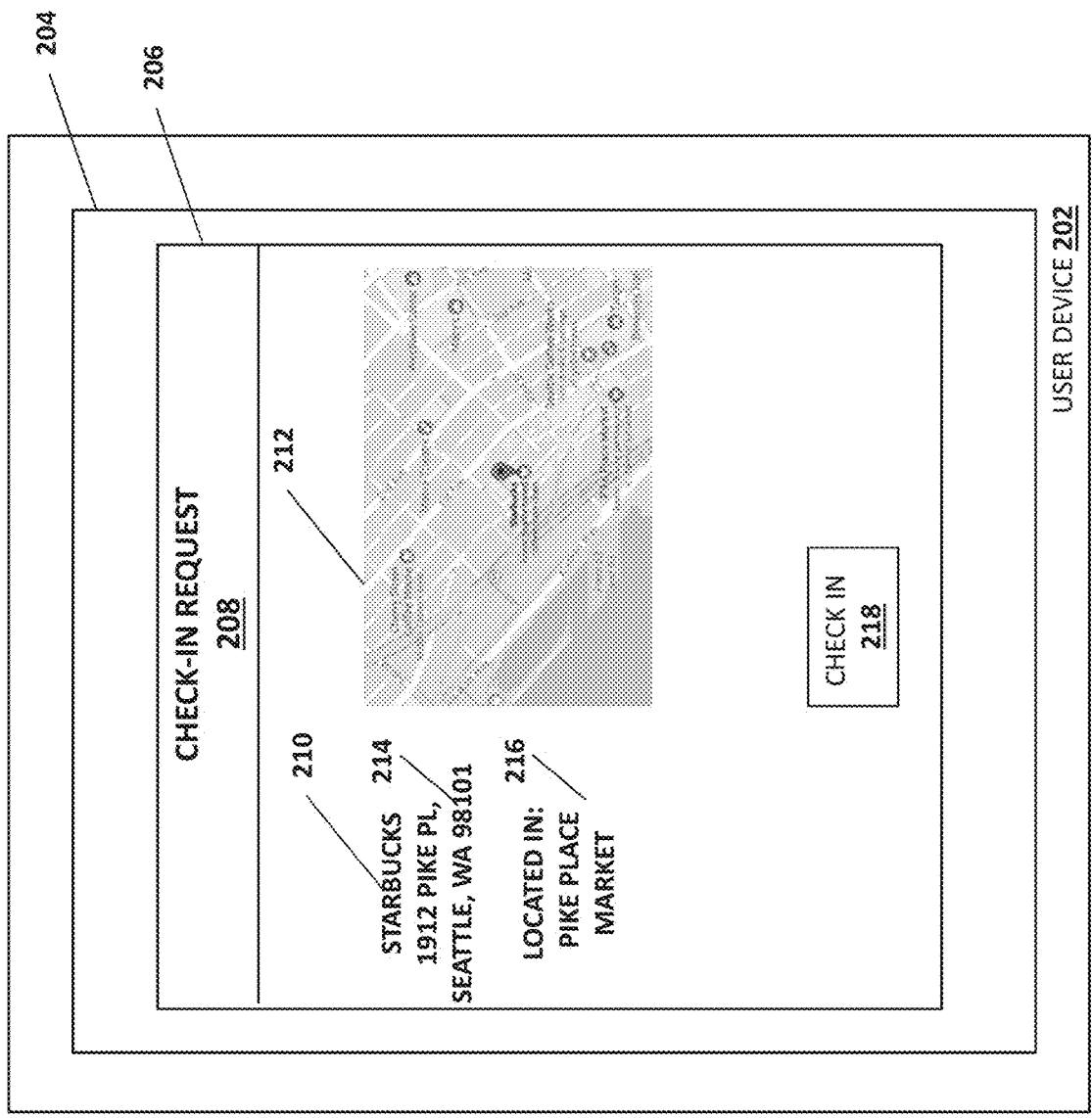
FIG. 2 is a schematic view illustrating an embodiment of a user device displaying a physical location check-in screen.

Referring to FIG. 2, an embodiment of a user device 202 is illustrated. The user device 202 includes a display subsystem 204 displaying a check-in request screen 206 that includes a check-in request 208 that is to be provided to a service provider device. In the illustrated example, the check-in request 208 is generated by a check-in application on the user device 202. The check-in request 208 includes a check-in location 210 (e.g., "STARBUCKS"). The check-in location 210 may include a physical address 214 (e.g., "1912 PIKE PL, SEATTLE, Wash. 98101") and a check-in area 216 (e.g., "PIKE PLACE MARKET"). The check-in request screen 206 may also include a map 212 indicating the check-in location 210 on the map 212. After a user confirms the check-in location 210, the user may select the button 218 ("CHECK IN") to submit the check-in request 208 to the service provider device.

In some embodiments, the check-in request 208 including the check-in location 210 may be sent to a third-party service provider device (e.g., a social network service provider device), which then send the check-in request 208 to the service provider device.

In some embodiments, the service provider device receives the asserted physical location of the user device through applications other than the check-in application, including, for example, shopping applications and payment applications.

The method may then proceed to block 104, where the system provider device may determine one or more reference features physically located at the asserted physical location provided by the user device. In some embodiments, at block 104, the reference features are determined using a physical location reference feature database coupled to the system provider device.

In various embodiments, the physical location reference feature database may store a plurality of features associated with a particular physical location and the spatial relationships between those reference features. The system provider device may collect images associated with the physical locations from various image sources. An image analyzer device coupled to the system provider device may extract features associated with the physical locations using those collected images. In an example, the image sources include cameras located at the physical locations that are controlled by the system provider device. Those cameras may be controlled to capture images of the physical locations according to a predetermined update period (e.g., daily, weekly), and send those images to the system provider device. In another example, the image sources include other user devices associated with other users, which send images associated with the physical locations to the system provider device during previous physical location verification processes. By using the images captured by user devices during previous physical location verification processes, the physical location reference feature database may be updated timely (e.g., each time a physical location verification process is performed for a particular location) without installing cameras at each physical location.

In some embodiments, the image analyzer device may perform a feature extraction process on the collected images to determine features associated with the physical location. The system provider device may then update (e.g., add, remove, modify features) the physical location reference feature database using the extracted features from the image analyzer device. In some embodiments, the features include physical elements (e.g., geophysically defined landforms including mountains, hills, water bodies such as rivers, lakes, ponds and the sea), living elements (e.g., plants, trees), and human elements (e.g., buildings, structures, bridges, signs). In some embodiments, the features include transitory features (e.g., lighting conditions at different times). In some embodiments, the physical location reference feature database may include various environmental conditions (e.g., weather, time, traffic) associated with a particular feature. In some embodiments, the physical location may correspond to an indoor space (e.g., a classroom). In such embodiments, the reference features may include furniture, decoration, and other items inside the indoor space.

In some embodiments, at block 104, the service provider device selects reference features from the stored features (e.g., in the physical location reference database) associated with the asserted physical location. In some embodiments, the service provider device selects the reference features based on a trust level of the user device. In an example, the service provider device determines that the user device is associated with a high trust level (e.g., based on its physical location verification history and other transaction histories), and may select a single reference feature having a less complicated shape, which may save time in subsequent image analyzing and matching steps. In another example, the service provider device determines that the user device is associated with a low trust level (e.g., based on past location spoofing detection), and may select two or more reference features having more complicated shapes, which improves security but may take more time to process in subsequent image analyzing and matching steps. In those embodiments, by selecting the reference features based on the trust level of the user device and the characteristics of the features, a balance between higher security and better user experience is achieved.

The method 100 may then proceed to block 106, where the service provider device generates a physical location verification request including the reference features, and sends that physical location verification request to the user device.

Figure 3A:
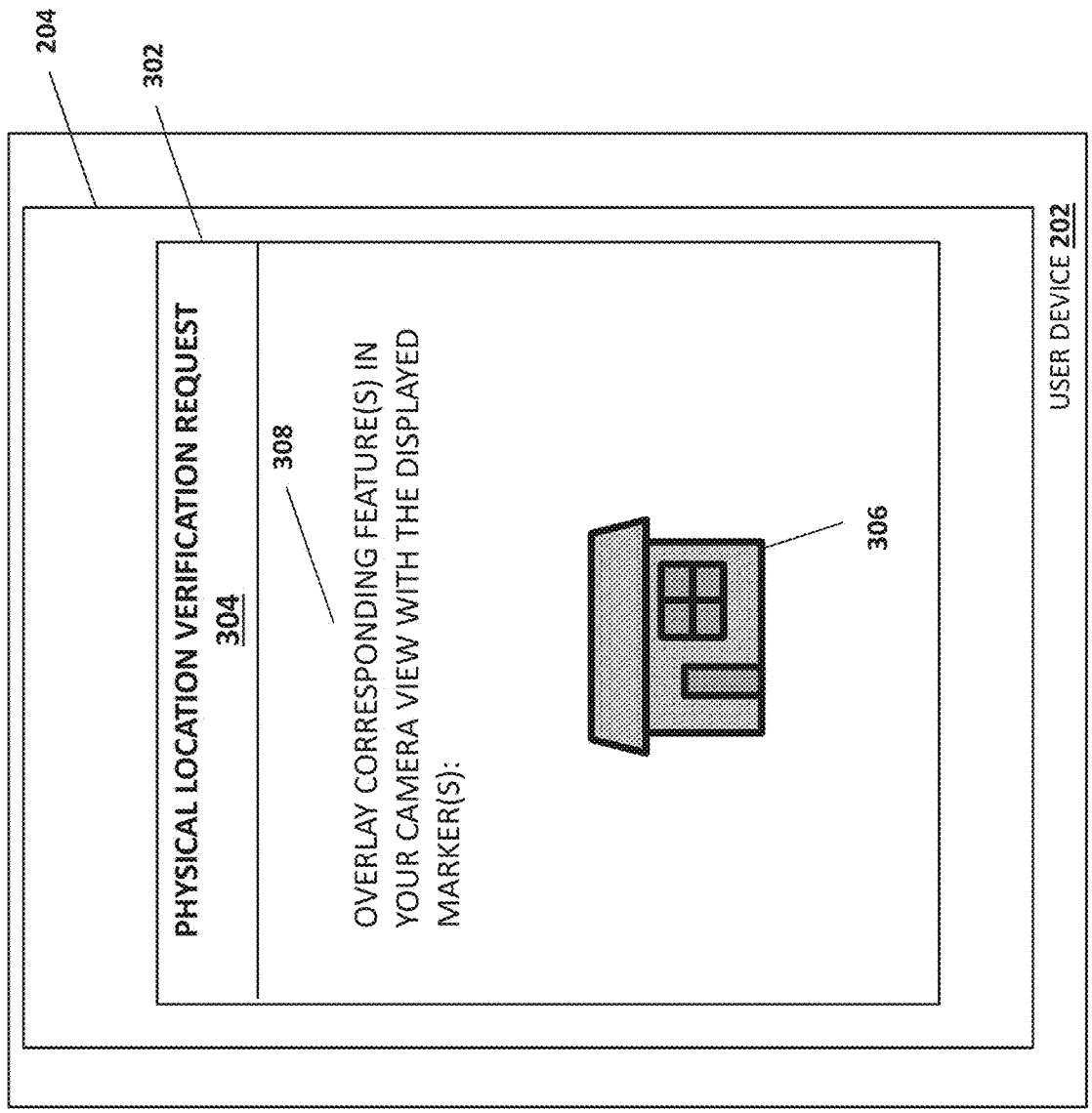
FIG. 3A is a schematic view illustrating an embodiment of a user device displaying a physical location verification request.

Referring to FIGS. 3A and 3B, at block 106, the physical location verification requests may include different configurations of markers of reference features that are to be displayed on the user device. Referring to FIG. 3A, illustrated is a user device 202. The user device 202 includes a display subsystem 204 displaying a location verification screen 302 that includes a physical location verification request 304 that is received from the service provider device. In the illustrated example, the physical location verification request 304 is generated based on a single reference feature, and includes a marker 306 corresponding to that reference feature. In some examples, the marker 306 is substantially the same as an image of the reference feature. The physical location verification request 304 also includes a movement instruction 308 requesting the user to move the user device such that the feature in the camera view of the user device corresponding to the reference feature overlays with the marker 306. In some examples, the marker 306 is partially translucent such that the user may be able to tell whether the feature in the camera view completely overlays with the marker 306.

In the example of FIG. 3B, the physical location verification request may include two or more reference features and their spatial relationships. The user device 202 includes a display subsystem 204 displaying a location verification screen 302 that includes a physical location verification request 350 that is received from the service provider device. In the illustrated example, the physical location verification request 350 is generated based on two reference features, and includes markers 306 and 352 corresponding to the two reference features. The relative positions of the markers 306 and 352 (e.g., including the distance D1) correspond to the real-world relative positions between the corresponding reference features. In some examples, the markers 306 and 352 are substantially the same as images of the reference features. The physical location verification request 350 also includes a movement instruction 308 requesting the user to move the user device such that the corresponding two features in the camera view of the user device overlays with the markers 306 and 352. In some examples, the markers 306 and 352 are partially translucent. In this example, the user is requested to move the user device so that two features in the camera view overlays with the displayed markers at the same time. As such, the user needs to move the user device to a more precise position compared to the movement requirement associated with the physical location verification request 304 of FIG. 3A.

Figure 4:
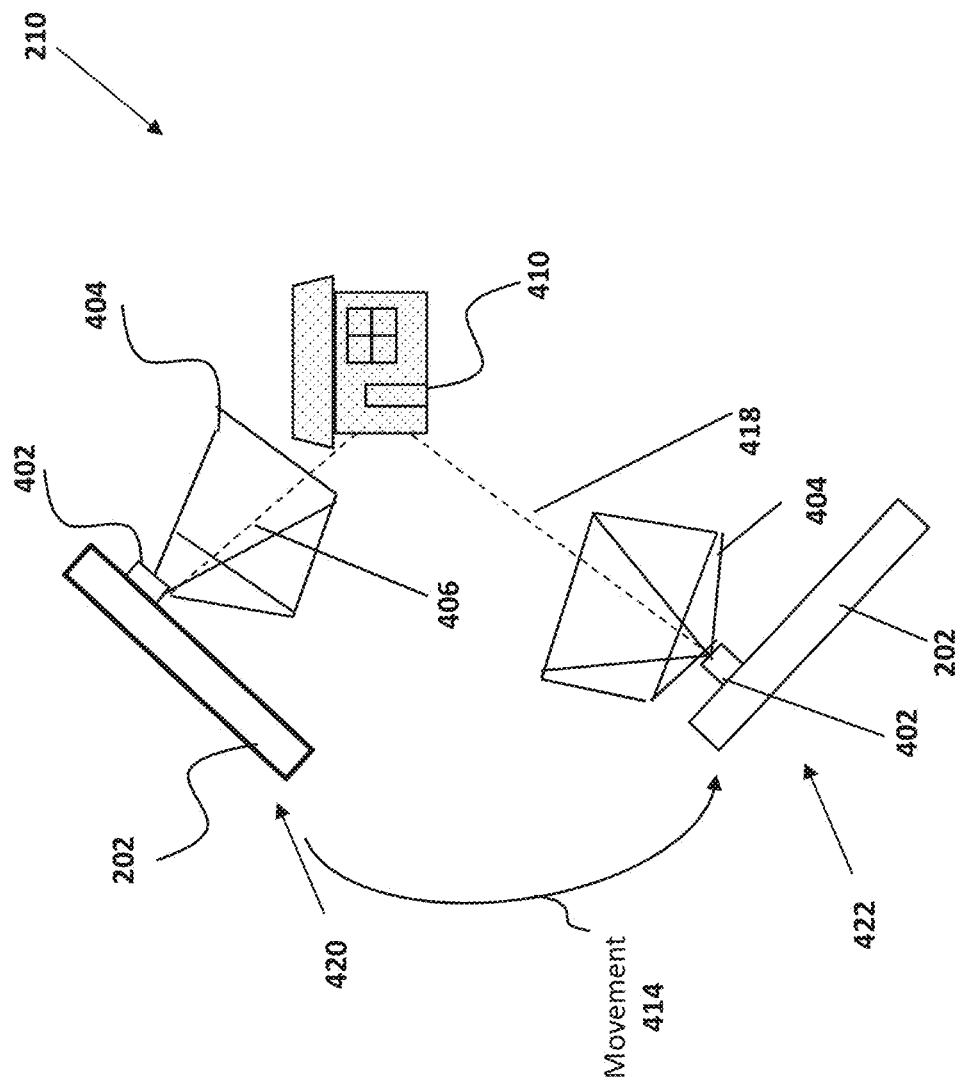
FIG. 4 is a schematic view illustrating an embodiment of a user device moved to capture images of the same features at a physical location from different perspectives and different distances.
Figure 5:
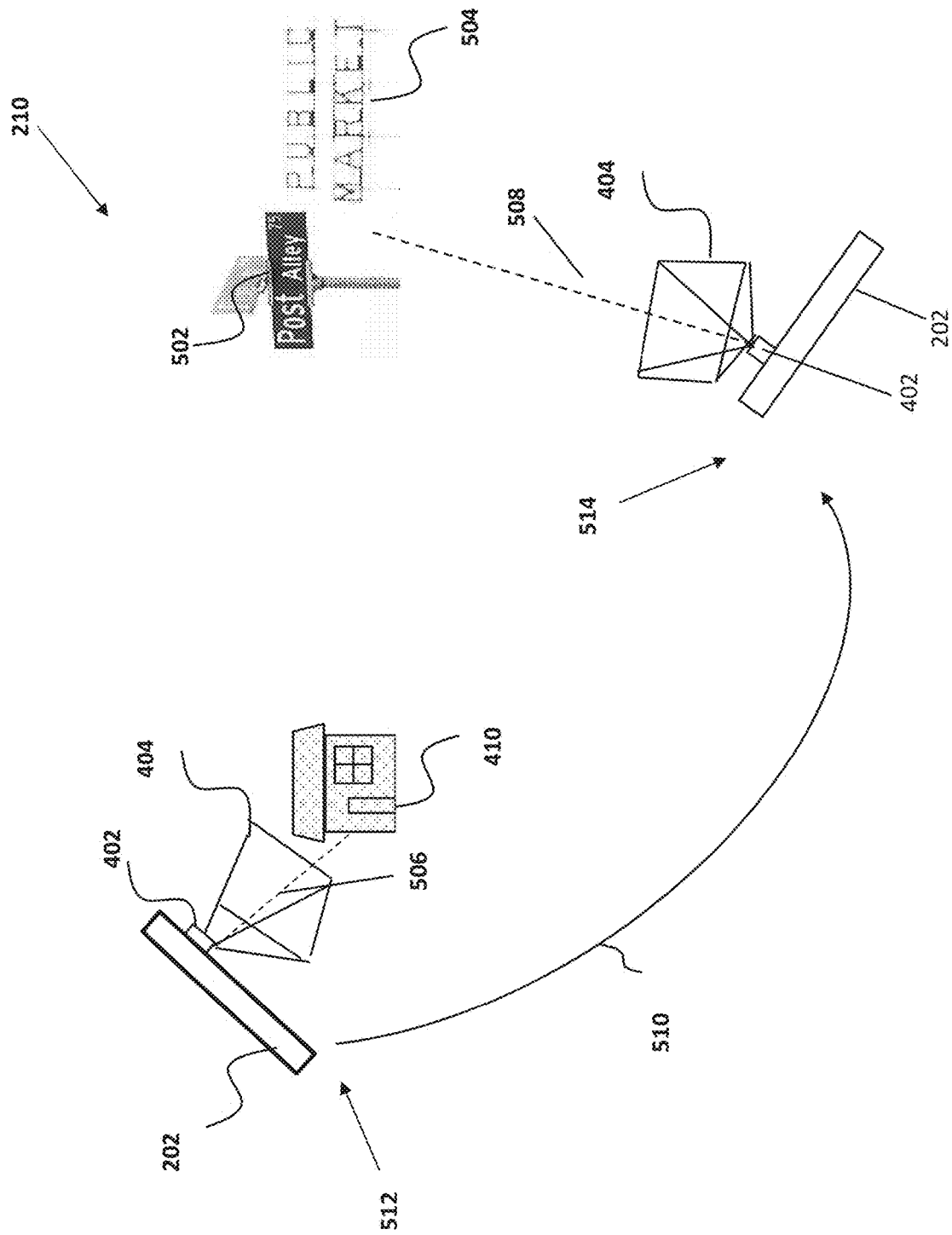
FIG. 5 is a schematic view illustrating an embodiment of a user device moved to capture images of different features at a physical location.

Referring to FIGS. 4 and 5, in various embodiments, at block 106, the physical location verification requests may include different movement instructions for guiding the user to move the user device such that corresponding features in the camera view overlay with those displayed markers. In some embodiments, to make location spoofing even more difficult, the movement instructions may request the user to perform random user device movements. In some embodiments, the movement instructions include a single movement (e.g., linear movement) for the user device, where the service provider device determines that the user device has a high trust level. In some embodiments, the movement instructions include a combination of many types (e.g., tilt, shake, swing, rotational movements, translational movements) of user device movement, where the service provider device determines that the user device has a low trust level. Further, the movement instructions may be determined on whether the user device is instructed to take images of the same feature from different perspectives or to take images of different features.

Referring to the example of FIG. 4, illustrated is a user device instructed by the physical location verification request to move and capture images of the same reference features from different perspectives and distances. As illustrated in FIG. 4, a reference feature 410 is located at the physical location 210 of the real world. The user device 202 begins at a begin position 420, where a camera 402 of the user device 202 has a view frustum 404 associated with a view orientation 406 directed at the reference feature 410. As such, the camera 402 may take an image (or frames of a video) including the reference feature 410 with the view orientation 406 from a first distance.

In some embodiments, the service provider device may instruct the user to move the user device (e.g., using movement instructions (e.g., in audio, visual cartoon, text) included in the physical location verification request that is displayed on the user device)). In the example of FIG. 4, following the moving instructions, the user moves the user device from the begin position 420 to an end position 422 in a movement 414. At the end position 422, the camera 402 of the user device 202 has a view frustum 404 associated with a view orientation 418. As such, the camera 402 may take an image (or frames in a video) including the reference feature 410 with the view orientation 418 from a second distance that may be different from the first distance. The moving instructions may direct the user to move the user device 202 in a particular way, such that the view orientation of the view frustum of the camera 402 always directs at the reference feature 410 during the movement 414.

Referring to the example of FIG. 5, in some embodiments, a user device may be moved according to movement instructions included in the physical location verification. In those embodiments, the user device may capture images of reference features at the end position of the movement that are different from the reference features captured at the begin position of the movement.

As shown in the example of FIG. 5, reference features 410, 502, and 504 are located at the physical location 210 of the real world. The user device 202 begins at a begin position 512, where a camera 402 of the user device 202 has a view frustum 404 associated with a view orientation 506 directed at the reference feature 410. As such, the camera 402 may take an image (or frames of a video) including the reference feature 410 with the view orientation 506 from a first distance.

In the example of FIG. 5, following the moving instructions, the user moves the user device from the begin position 512 to an end position 514 in a movement 510. At the end position 514, the camera 402 of the user device 202 has a view frustum 404 associated with a view orientation 518 directed at the reference features 502 and 504. As such, the camera 402 may take an image (or frames in a video) including the reference features 502 and 504 with the view orientation 508. In some embodiments, the moving instructions may direct the user to move the user device 202 in a particular way, such that during the movement, the camera 402 may capture images of other reference features.

The method 100 may then proceed to block 108, where the service provider device receives, from a sensor system of the user device, sensor data including movement data associated with the movement of the user device.

Figure 6:
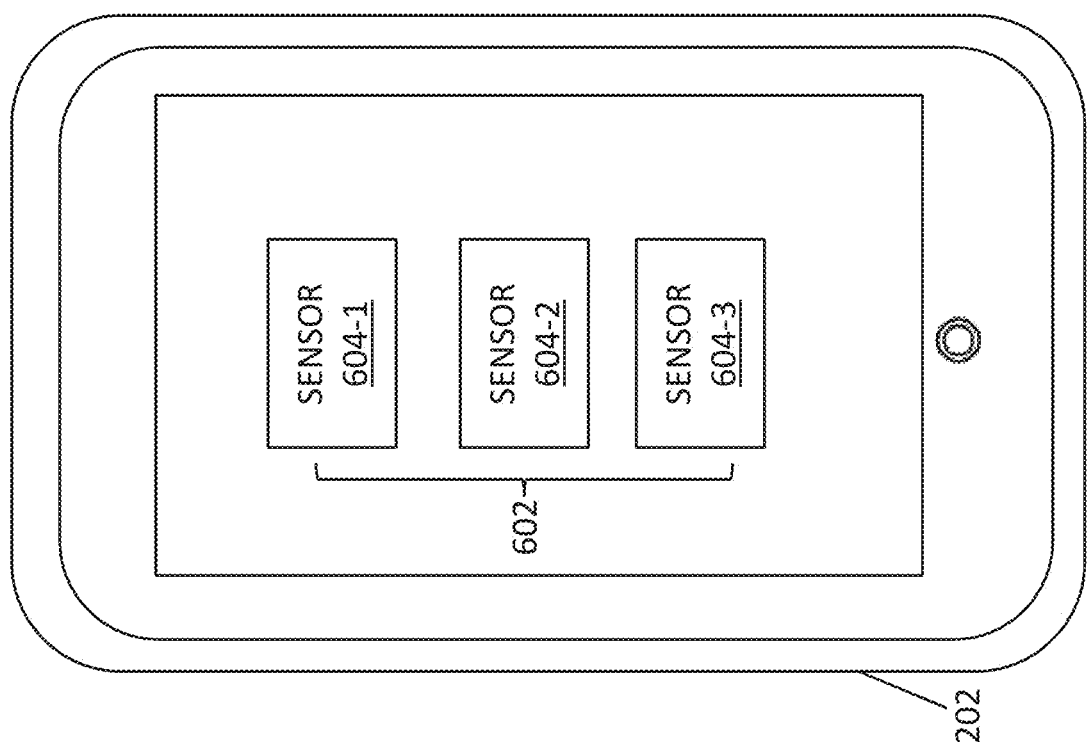
FIG. 6 is a schematic view illustrating an embodiment of a user device and its sensor system.

Referring to FIG. 6, illustrated is a user device 202 including a sensor system 602 including a plurality of sensors 604-1, 604-2, and 604-3. These sensors may include, but are not limited to ambient light sensors, image sensors including front-facing image sensors and back-facing image sensors, proximity sensors, temperature sensors, location sensors, noise sensors, barometers, GPS units, transceivers, compasses, and motion sensors. The motion sensors may include for example, gyroscopes and accelerometers. These sensors 604-1, 604-2, and 604-3 gather sensor data that can be used to estimate a current and actual state of the user device. For example, an ambient light sensor can be used to detect whether the user device is placed in a dark environment (e.g., during the night) or a well-lit environment (e.g., during the day). As another example, a front-facing image sensor can be used to capture front-facing camera view and detect whether anyone (including the user associated with the user device) is currently looking at the user device 202 or not. As another example, a back-facing image sensor can be used to capture back-facing camera view of the physical location of the user, which may include various features (e.g., buildings, trees, signs) in the physical location.

In some embodiments, the sensor system 602 includes motion sensors providing movement information of the user. The motion sensors may include for example gyroscopes and accelerometers. For example, a gyroscope sensor may be used to detect an orientation of the user device 202 (e.g., is the user device 202 facing up or down or sideways?). For further example, an accelerometer sensor may be used to detect whether the user device 202 is stationary or moving, and the direction and speed of the user device 202's movement.

In some embodiments, the user device includes one or more environmental sensors (e.g., a thermostat, a hygrometer) to measure the temperature, humidity, air, oxygen, carbon monoxide, and other environmental information in the physical location 210 received from the user device 202.

In some embodiments, the user device 202 includes one or more cameras to capture images or videos of the physical location of the user device 202 including the user. Those images or videos may be used to determine conditions (e.g., road conditions, traffic conditions, weather conditions) at the asserted physical location.

In some embodiments, the motion sensors may be implemented using hardware, software, or a combination thereof. In an example, software implemented motion sensors, including for example motion sensors for gravity, linear acceleration, rotation vector, significant motion, step counter, and step detector may derive data from hardware implemented motion sensors including, for example, an accelerometer, a magnetometer, and a gyroscope.

In some embodiments, with the user's consent, these sensor data collected from the sensor system 602 may be sent to the service provider device or for further analysis and modeling for performing the physical location verification.

Figure 7:
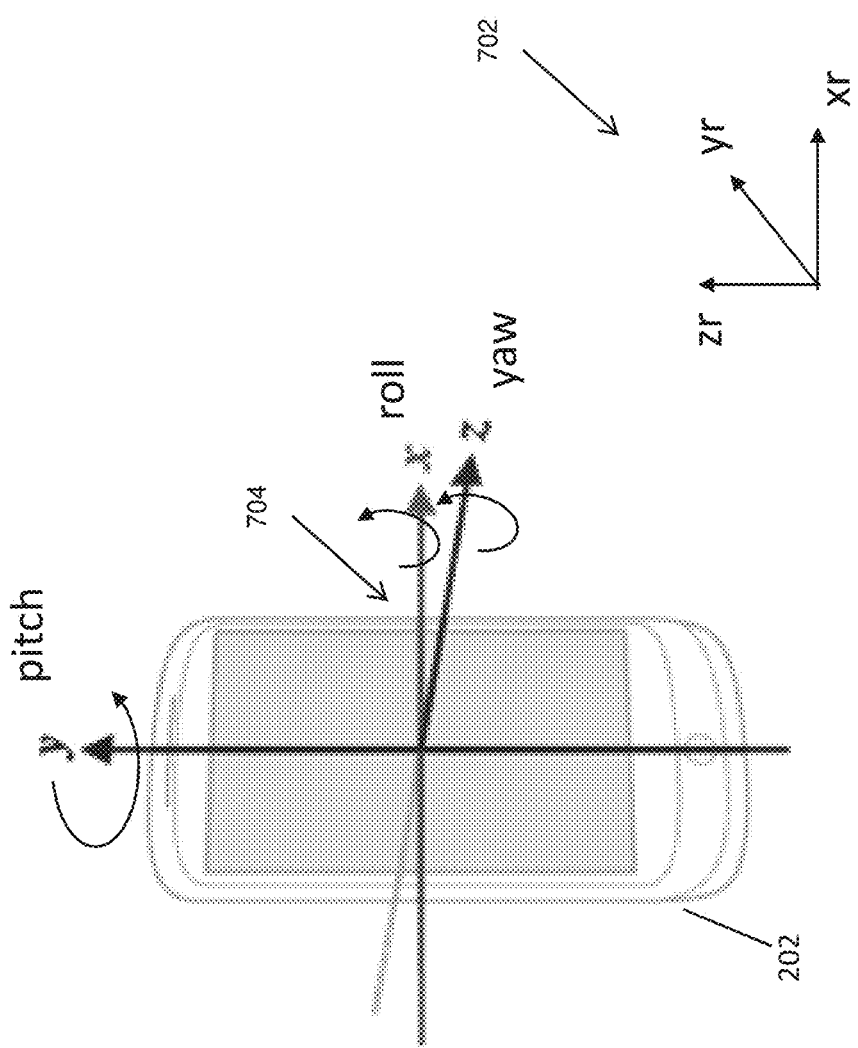
FIG. 7 is a schematic view illustrating an embodiment of a user device, a user device's frame of reference, and a world's frame of reference.

Referring to FIG. 7, in some embodiments, the motion sensors of the user device 202 may generate movement data for movements relative to the user device's frame of reference 704. These movement data may include movements including, for example, tilt, shake, rotation, and swing of the user device.

In some embodiments, the movement data include motion relative to the world's frame of reference 702. For example, the accelerometer sensor may be used to measures the acceleration applied to the user device 202.

In some embodiments, a user may attempt location spoofing by providing both fake movement data and corresponding fake image data. By providing movement instructions that instruct the user to move the user device in real-time, the service provider device may be able to detect fake movement data and/or fake image data, thereby preventing location spoofing.

The method 100 may then proceed to block 110, where the service provider device may receive a sequence of images (or a video including a sequence of frames) captured by a camera of the user device during the movement of the user device. Referring to FIG. 8, illustrated is a user device displaying that the reference feature 410 in the camera view and displayed on the user device 202 overlays with the marker 306 for the reference feature 410. In some embodiments, the user determines that the overlay is complete, and selects the button 802 to submit the sequence of captured images. Alternatively, the user device may automatically determine that the overlay is complete, and then send the captured image data to the service provider device.

Figure 9B:
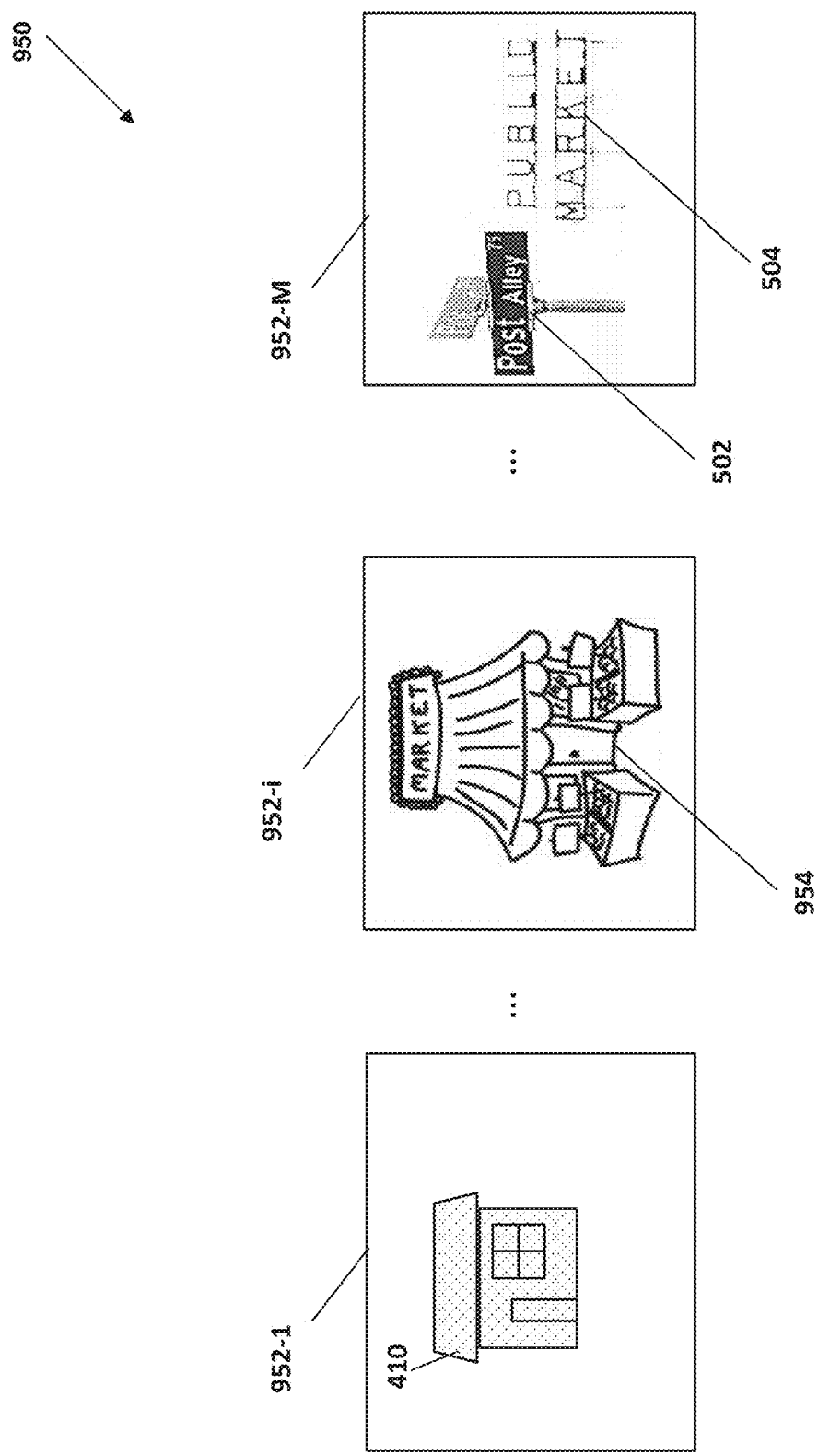
FIG. 9B is a schematic view illustrating an embodiment of image data captured by a user device in response to a physical location verification request.

Referring to FIGS. 9A and 9B, the image data collected during the physical location verification process may include many forms, such as a video including a sequence of frames, a sequence of still images, or any other suitable form of image data.

Referring to FIG. 9A, in some embodiments, the image data may include a video 900 including a sequence of N frames 902-1 through 902-N, N being a positive integer. Each frame includes an image of the same reference feature 908 (e.g., a piggy bank statue) but captured from different view orientations and/or distances during a movement of the user device 202. In the example of FIG. 9A, the user device 202 is moved according to the movement instructions such that the reference feature 908 is always in the camera view.

Referring to FIG. 9B, in some embodiments, the image data may include a video 950 including a sequence of M frames 952-1 through 952-M, M being a positive integer. The frames may include different reference features at the physical location 210. In the particular example of FIG. 9B, the physical location 210 includes reference features 410, 502, 504, and 954. The video 950 may be captured during a movement 510 of FIG. 5. As illustrated in FIG. 9B, the frame 952-1 includes the reference feature 410, and the frame 952-M includes images of reference features 502 and 504 that are different from the reference feature 410. A frame 952-i in the middle of the sequence includes an image of another reference feature 954.

The method 100 may then proceed to block 112, where the service provider device, together with an image analyzer device coupled to the service provider device, analyzes the image data and the sensor data (e.g., the movement data, environment data) received from the user device 202 to verify the physical location of the user.

In some embodiments, one or more verification criteria may be used for verifying the physical location. In an example, the verification criteria include a marker matching verification criterion. In that example, the image analyzer device determines that the features in the image data match the positions of the corresponding markers displayed on the user device, and in response to the determination, verify the physical location of the user.

In some embodiments, the verification criteria include a motion estimation verification criterion associated with movement estimations based on the image data. The image analyzer device may generate movement estimations including various types of movement information (e.g., rotational direction and speed, translational movement direction and speed). Various motion estimation algorithms, including for example pixel based methods (e.g., block-matching algorithm, phase correlation and frequency domain methods, pixel recursive algorithms, optical flow methods) and feature based methods (e.g., by matching corresponding features between frames) to generate motion estimations of the user device. Based on the motion estimation verification criterion, the system provider device may determine that motion estimation based on the image data matches the movement data from the sensor system of the user device 202. In some embodiments, the image analyzer device may consider various environment conditions (e.g., road conditions, traffic conditions, and weather conditions) based on the sensor data from the sensor system in such a determination. In response to the determination, the system provider device may verify that the user, with the user device, is located at the physical location.

In some embodiments, the service provider device verifies that the user device is located at the physical location by applying an environment factor criterion. For example, the service provider device receives real-time environment condition information (e.g., temperature, moisture) from a sensor system located at the physical location and controlled by the service provider device, a third party environment condition provider, or any other suitable sources. According to the environment factor criterion, the service provider device may verify that the user device is located at the physical location after matching the environment conditions received from the sensor system 602 of the user device 202 and the environment conditions that the service provider device received from other sources (e.g., the sensor system controlled by the service provider device).

In some embodiments, the service provider device may determine the verification criteria for the user device based on a trust level associated with the user device and/or the user account. In an example, for a user device having a high trust level, the service provider device may apply a single verification criterion (e.g., the marker matching criterion), which may take less time to process. In another example, for a user device having a low trust level, the service provider device may apply a plurality of verification criteria including for example, the marker matching criterion, the motion estimation verification criterion, the environment factor criterion, and any other suitable verification criterion. Such verification criteria may provide improved security but take more time to process. By determining the verification criteria based on the user device trust level, a balance between security and user experience may be achieved.

The method 100 may then proceed to block 114, where the service provider device may notify the first user that the physical location is verified, and perform location-based services associated with the user device using the verified physical location. The service provider device may send a physical location verification signal to third party providers (e.g., shopping applications, financial applications, social network applications), which in response, may allow the user device to access location-based services using the verified physical location.

Thus, systems and methods have been described that provide physical location verification. The physical location verification system may detect spoofed physical locations, and verify actual real-time physical location of the user. In some embodiments, a system provider may perform a physical location verification process to verify that a user is actually at the physical location asserted by the user device. For example, the service provider device may determine reference features that are physically located at the asserted physical location, and send to the user device a physical location verification request for displaying a reference image including markers of those reference features on the user device. In response to the physical location verification request, the user may move the user device such that corresponding features in the camera view overlay the markers displayed on the user device. By matching the features in the camera view of the user device with the markers of the reference features, the service provider device verifies that the user is actually at the physical location. To further prevent location spoofing, the service provider device may send movement instructions (e.g., including random user device movements) to the user. By analyzing imaging data captured while the user device is moved according to the movement instructions, the service provider device may detect location spoofing using pre-captured still images or videos. Furthermore, the service provider device may determine the reference features based on latest images of the physical location captured by other users, thereby providing more updated reference features for the physical location verification. Additionally, the service provider device may determine the reference features, the movement instructions, and/or the verification criterion based on the image data and movement data based on a trust level of the user device and/or the user account, thereby achieving a balance between security and user experience.

In other embodiments, sound capture may be included in addition to or in place of the image capture for authenticating a user at a location. For example, if the service provider knows certain sounds are associated with a certain location at a certain time in the day, a certain day in the month, or other temporal point, the service provider may provide the user instructions to capture sound at a particular location and/or at a particular time. The sound capture can be in conjunction with image capture through a video capture device of the user device or on its own through a microphone or other audio capture device. Sounds may be stored by or accessible to the service provider for comparing with the captured sounds using similar methods as discussed above with image capture and analysis. Examples of unique sounds include, but are not limited to, construction sounds, concert sounds, holiday sounds, environmental sounds (such as thunder, rain, or wind), crowd sounds unique to a specific location, car sounds, water sounds, and airplane sounds.

Figure 10:
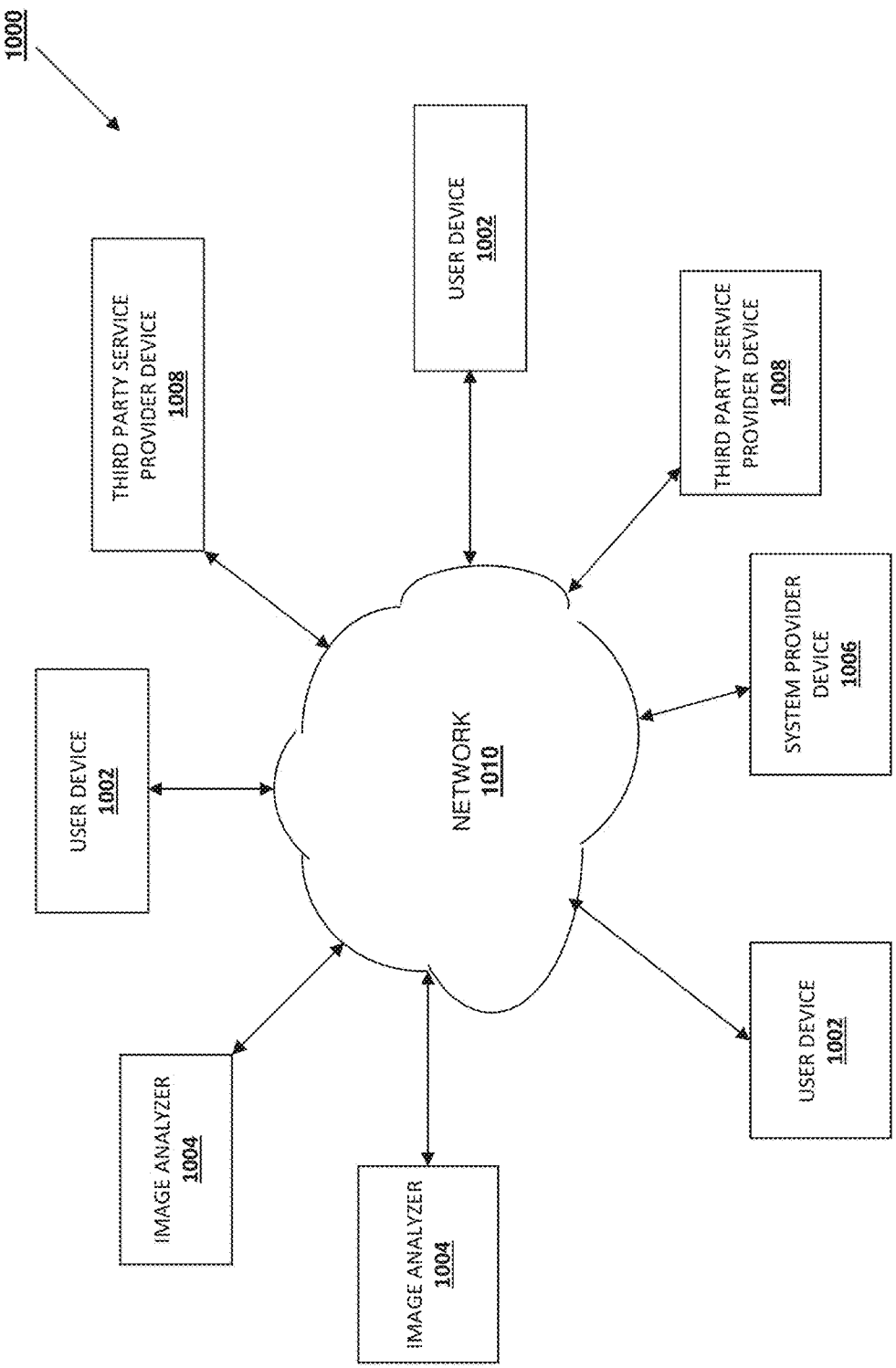
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Example servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more image analyzer devices 1004, one or more system provider devices 1006, and one or more third party service provider devices 1008 in communication over a network 1010. Any of the user devices 1002 may be the user device 202 discussed above and used by the user discussed above. The system provider device 1006 may be the system provider device discussed above and may be operated by a system provider such as, for example, PayPal Inc. of San Jose, Calif. The third party service provider device 1008 may be the service provider device discussed above and may be operated by various service providers including payment service providers, gaming service providers, travel service providers, and/or any other service providers.

The user devices 1002, image analyzer devices 1004, system provider devices 1006, and third party service provider devices 1008 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the user to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include a physical location verification application provided by a system provider through the system provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the image analyzer device 1004, the system provider device 1006, and/or the third party service provider device 1008 to associate the user with a particular account as further described herein.

Note that image analyzer device 1004 may be a part of another device, such as system provider device 1006, in various embodiments. Functionality of various ones of the devices shown in FIG. 10 and/or referred to herein may be combined into a single or different devices as consistent with the techniques discussed. Thus, functionality or structures described individually relative to the image analyzer 1004, system provider device 1006, or third party service provider device 1008 may be combined into one or more systems in various embodiments.

Figure 11:
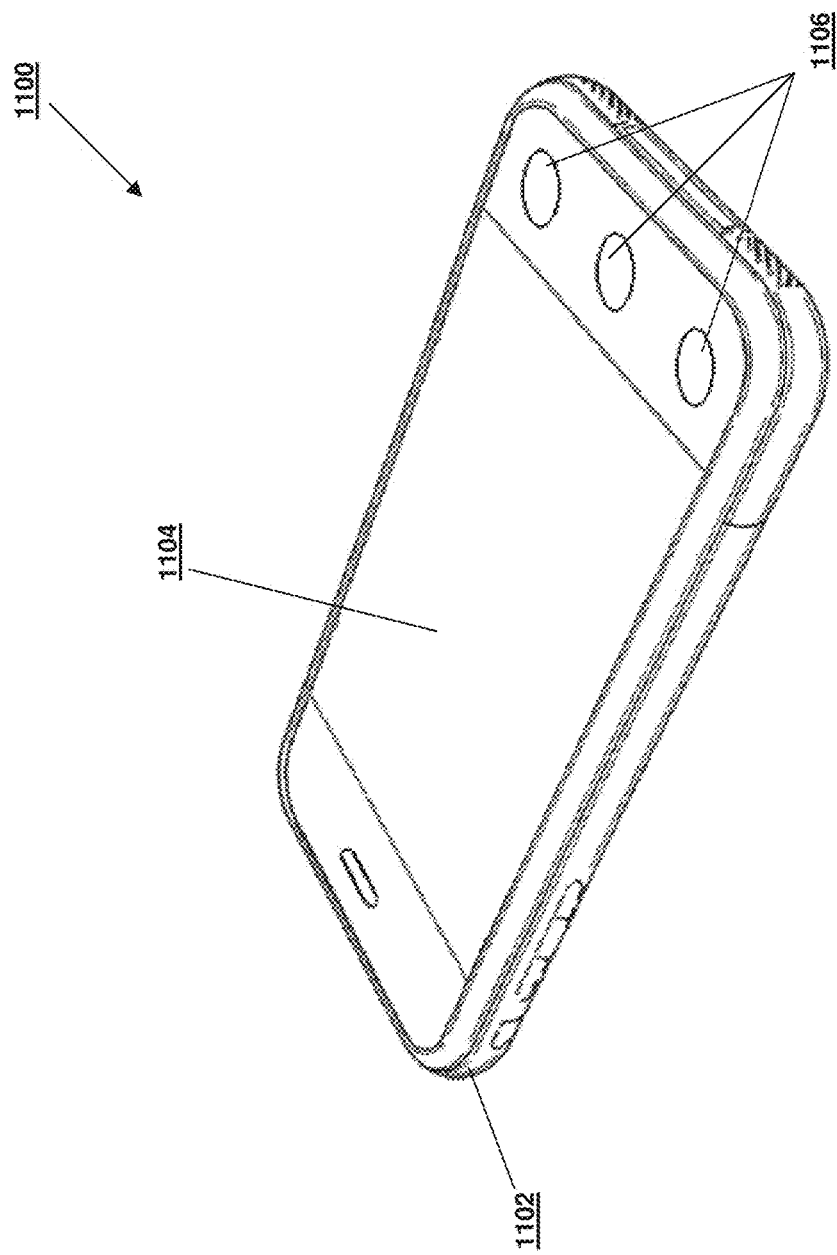
FIG. 11 is a perspective view illustrating an embodiment of a user device.

Referring now to FIG. 11, an embodiment of a user device 1100 is illustrated. The user device 1100 may be the user device 202. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile user devices may be used in the method 100 without departing from the scope of the present disclosure.

Figure 12:
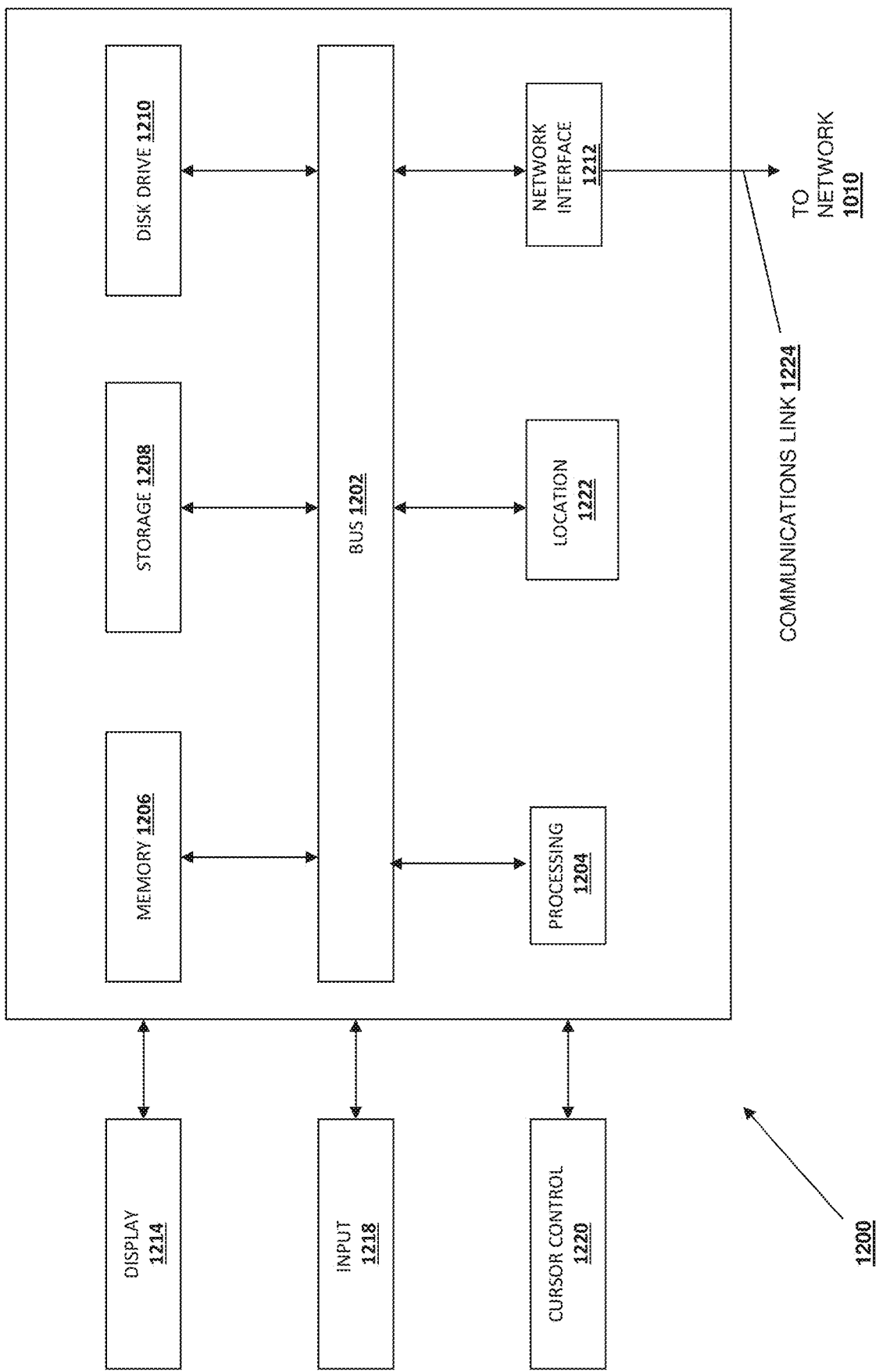
FIG. 12 is a schematic view illustrating an embodiment of a computer system.

Referring now to FIG. 12, an embodiment of a computer system 1200 suitable for implementing, for example, the computer systems of the user device 202, user devices 1002, the computer systems of image analyzer devices 1004, system provider devices 1006, and third party service provider devices 1008, is illustrated. It should be appreciated that other devices utilized by users, payment service providers, other third party service providers, and/or system providers in the system discussed above may be implemented as the computer system 1200 in a manner as follows. In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user device 202, the system provider device 500, user devices 1002, image analyzer devices 1004, system provider devices 1006, and third party service provider devices 1008.

Such instructions may be read into the system memory component 1206 from another computer-readable medium, such as the static storage component 1208 or the disk drive component 1210. In other embodiments, hard-wired circuitry may be used in place of or in combination with software instructions to implement the present disclosure.

Logic may be encoded in a computer-readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
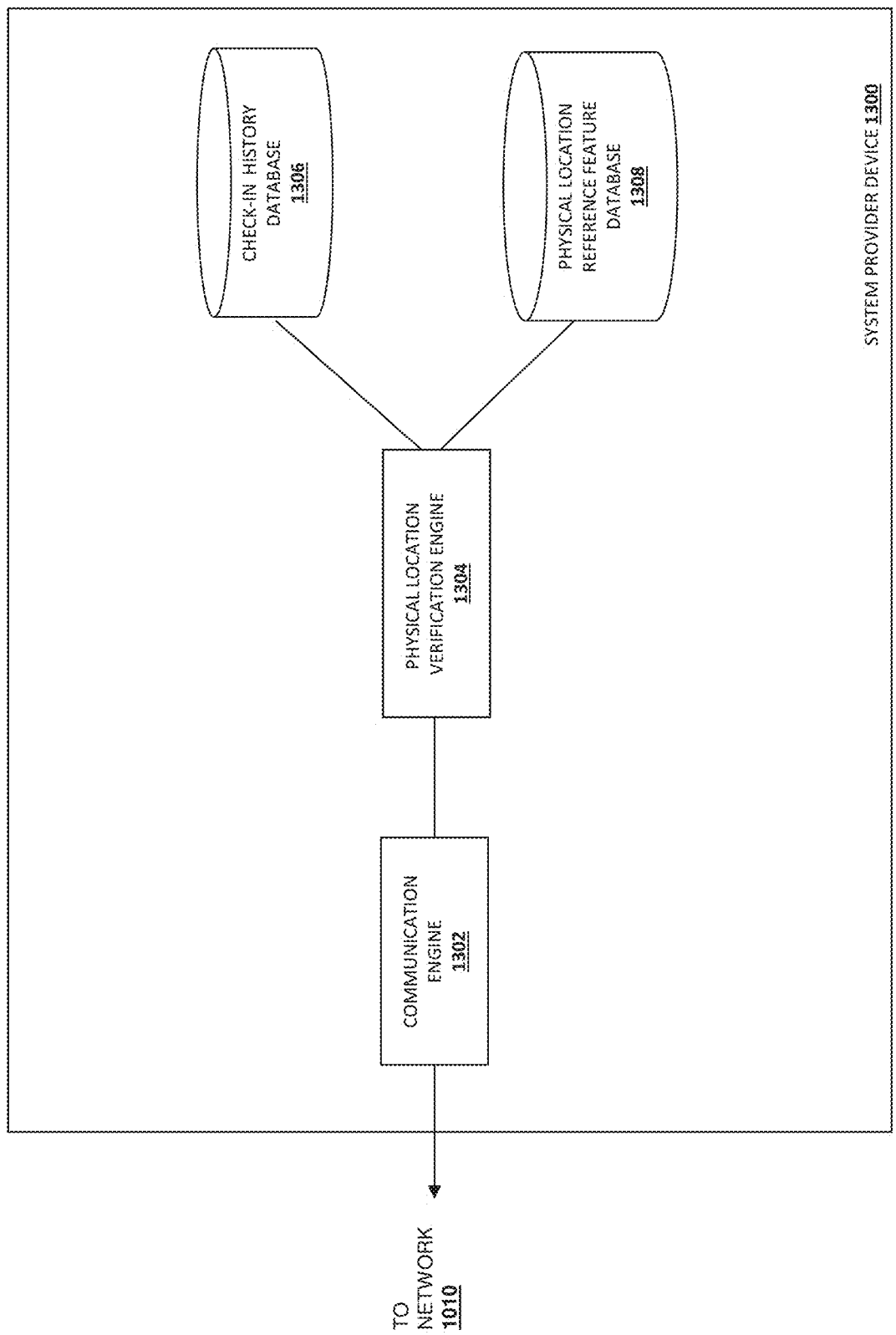
FIG. 13 is a schematic view illustrating an embodiment of a system provider device.

Referring now to FIG. 13, an embodiment of a system provider device 1300 is illustrated. In an embodiment, the system provider device 1300 may be the system provider devices discussed above. The system provider device 1300 includes a communication engine 1302 that is coupled to the network 1010 and to a physical location verification engine 1304 that is coupled to a check-in history database 1306 and a physical location marker database 1308. The communication engine 1302 may be software or instructions stored on a computer-readable medium that allows the system provider device 1300 to send and receive information over the network 1010. The physical location verification engine 1304 may be software or instructions stored on a computer-readable medium that is operable to receive, from a first user device, a first physical location associated with the first user device; determine a first feature physically located at the first physical location; send, to the first user device, a first physical location verification request associated with displaying a first reference image of the first feature on the first user device; receiving, from a sensor system of the first user device, first movement data associated with a first movement of the first user device; receive, from the first user device, first image data captured by a first camera of the first user device during the first movement in response to the first physical location verification request; and analyze the first image data and first movement data to verify that the first user device is physically located at the first physical location, and provide any of the other functionality that is discussed above. While the databases 1306-1308 have been illustrated as separate from each other and located in the system provider device 1300, one of skill in the art will recognize that any or all of the databases 1306-1308 may be combined and/or may be connected to the physical location verification engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving, from a first user device, a first physical location associated with the first user device;
determining a first feature physically located at the first physical location;
sending, to the first user device, a first physical location verification request associated with displaying a first reference image including a first marker associated with the first feature on the first user device;
receiving, from a sensor system of the first user device, first movement data associated with a first movement of the first user device;
receiving, from the first user device, first image data captured by a first camera of the first user device during the first movement in response to the first physical location verification request; and
verifying that the first user device is physically located at the first physical location by analyzing the first image data and the first movement data, wherein the analyzing the first image data and the first movement data comprises:
determining a first velocity of the first user device based on the first image data; and
determining that the first velocity of the first user device matches a second velocity of the first movement data.

2. The system of claim 1, wherein the first reference image includes a second marker associated with a second feature physically located at the first physical location,
wherein the first image data includes a sequence of captured images, and
wherein the operations further comprising:
in response to a determination that a last captured image of the sequence includes third and fourth image element corresponding, respectively, to the first marker and the second marker, verifying further that the first user device is physically located at the first physical location.

3. The system of claim 1, wherein the operations further comprise:
receiving, from a second user device, second image data captured by a second camera of the second user device at the first physical location;
determining an identity of the first feature based on the second image data; and
generating the first physical location verification request based on the identity of the first feature.

4. The system of claim 1, wherein the operations further comprise:
sending, to a second user device, a second physical location verification request associated with displaying a second reference image of the first feature on the second user device,
wherein the second reference image is generated based on the first image data received from the first user device.

5. The system of claim 1, wherein the first physical location verification request includes one or more user device movement instructions for moving the first user device.

6. The system of claim 5, wherein the operations further comprise:
analyzing the first image data to determine a second movement of the first user device; and
in response to a determination that the first movement of the first user device matches the second movement of the first user device, verifying further that the first user device is physically located at the first physical location.

7. The system of claim 1, wherein the sensor system includes at least one of an accelerometer or a gyroscope.

8. A method, comprising:
receiving, by one or more service provider devices from a first user device, a first physical location associated with the first user device;
determining, by the one or more service provider devices, a first feature physically located at the first physical location;
sending, by the one or more service provider devices to the first user device, a first physical location verification request associated with displaying a first reference image, including a first marker associated with the first feature, on the first user device;
receiving, by the one or more service provider devices from a sensor system of the first user device, first movement data associated with a first movement of the first user device;
receiving, by the one or more service provider devices from the first user device, first image data captured by a first camera of the first user device during the first movement in response to the first physical location verification request; and
verifying, by the one or more service provider devices, that the first user device is physically located at the first physical location by analyzing the first image data and the first movement data, wherein the analyzing the first image data and the first movement data comprises:
determining a first velocity of the first user device based on the first image data; and
determining that the first velocity of the first user device matches a second velocity of the first movement data.

9. The method of claim 8, wherein the first reference image includes a second marker associated with a second feature physically located at the first physical location,
wherein the first image data includes a sequence of captured images, and
wherein the analyzing the first image data and the first movement data further comprises:
determining that a last captured image of the sequence includes third and fourth image element respectively corresponding to the first marker and the second marker.

10. The method of claim 8, further comprising:
receiving, from a second user device, second image data captured by a second camera of the second user device at the first physical location;
determining an identity of the first feature based on the second image data; and
generating the first physical location verification request based on the identity of the first feature.

11. The method of claim 8, further comprising:
sending, to a second user device, a second physical location verification request associated with displaying a second reference image, including a second marker associated with the first feature, on the second user device,
wherein the second reference image is generated based on the first image data received from the first user device.

12. The method of claim 8, wherein the first physical location verification request includes one or more user device movement instructions for moving the first user device.

13. The method of claim 12, further comprising:
analyzing the first image data to determine a second movement of the first user device; and
in response to a determination that the second movement of the first user device matches the one or more user device movement instructions, verifying that the first user device is physically located at the first physical location.

14. The method of claim 8, wherein the sensor system includes at least one of an accelerometer or a gyroscope.

15. A non-transitory machine-readable medium having stored thereon machine-readable instructions executable by a machine to cause the machine to perform operations comprising:
receiving, from a first user device, a first physical location of the first user device;
determining a first feature physically located at the first physical location;
sending, to the first user device, a first physical location verification request, wherein the first physical location verification request comprises a first reference image having a first marker associated with the first feature;
receiving, from a sensor system of the first user device, first movement data associated with a first movement of the first user device;
receiving, from the first user device, first image data captured by a first camera of the first user device during the first movement; and
verifying that the first user device is physically located at the first physical location by analyzing the first image data and the first movement data, wherein the analyzing the first image data and the first movement data comprises:
determining a first velocity of the first user device based on the first image data; and
determining that the first velocity of the first user device matches a second velocity of the first movement data.

16. The non-transitory machine-readable medium of claim 15, wherein the operations further comprise:
determining that an image frame of the first image data includes a first image element that matches the first marker of the first reference image.

17. The non-transitory machine-readable medium of claim 15, wherein the operations further comprise:
receiving, from a second user device, second image data captured by a second camera of the second user device at the first physical location;

determining an identity of the first feature based on the second image data; and generating the first physical location verification request based on the identity of the first feature.

18. The non-transitory machine-readable medium of claim 15, wherein the operations further comprise:

sending, to a second user device, a second physical location verification request associated with displaying a second reference image of the first feature on the second user device, wherein the second reference image is generated based on the first image data received from the first user device.

19. The non-transitory machine-readable medium of claim 15, wherein the first physical location verification request includes one or more user device movement instructions for moving the first user device.

20. The non-transitory machine-readable medium of claim 15, wherein the sensor system includes at least one of an accelerometer or a gyroscope.

* * * * *